US008695188B2

(12) United States Patent
Zillmer et al.

(10) Patent No.: US 8,695,188 B2
(45) Date of Patent: Apr. 15, 2014

(54) EXTRACTOR TOOL FOR BEARING RINGS

(75) Inventors: Hans-Joachim Zillmer, Schwebheim (DE); Dominik Gross, Niederwerrn (DE); Gerhard Halbig, Sulzthal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 592 days.

(21) Appl. No.: 12/950,436

(22) Filed: Nov. 19, 2010

(65) Prior Publication Data
US 2012/0066877 A1    Mar. 22, 2012

(30) Foreign Application Priority Data

Sep. 17, 2010    (DE) .......................... 20 2010 012 741

(51) Int. Cl.
*B23P 11/00*    (2006.01)
(52) U.S. Cl.
USPC ............................................ 29/244; 29/270
(58) Field of Classification Search
USPC .............. 269/8, 95, 60, 55, 71; 451/285–288
See application file for complete search history.

(56) References Cited

U.S. PATENT DOCUMENTS

| 2,823,567 | A * | 2/1958 | Pothier ........................... 269/71 |
| 4,638,786 | A * | 1/1987 | Lucky .............................. 126/24 |
| 7,012,495 | B2 * | 3/2006 | Underwood et al. ......... 335/288 |
| 7,587,800 | B2 * | 9/2009 | Dasbach et al. ................ 29/267 |
| 7,686,287 | B2 * | 3/2010 | Dixon et al. .................... 269/75 |
| 8,291,563 | B2 * | 10/2012 | Harris et al. ................. 29/281.1 |
| 2008/0048372 | A1 * | 2/2008 | Silverman ......................... 269/8 |
| 2010/0078864 | A1 * | 4/2010 | Lancaster-Larocque ......... 269/8 |
| 2012/0066877 | A1 * | 3/2012 | Zillmer et al. .................. 29/244 |
| 2013/0059505 | A1 * | 3/2013 | Bailey ............................. 451/59 |

FOREIGN PATENT DOCUMENTS

| NL | 9000631 A | 10/1991 |
| NL | 1021272 C2 | 2/2004 |

* cited by examiner

*Primary Examiner* — Lee D Wilson
(74) *Attorney, Agent, or Firm* — Lucas & Mercanti, LLP

(57) ABSTRACT

An extractor tool, in particular for bearing rings. This extractor tool is intended to be suitable, in particular, for extracting, or demounting, bearing rings, and it is also intended to be used in mounting situations in which radial access and bilateral axial access to the machine part to be demounted are not possible and, in addition, the extractor tool is to be simple and cost-effective to produce and easy to operate. The extractor tool has at least one magnet for non-positively connecting the extractor tool to a machine part to be extracted, in particular a bearing ring.

12 Claims, 1 Drawing Sheet

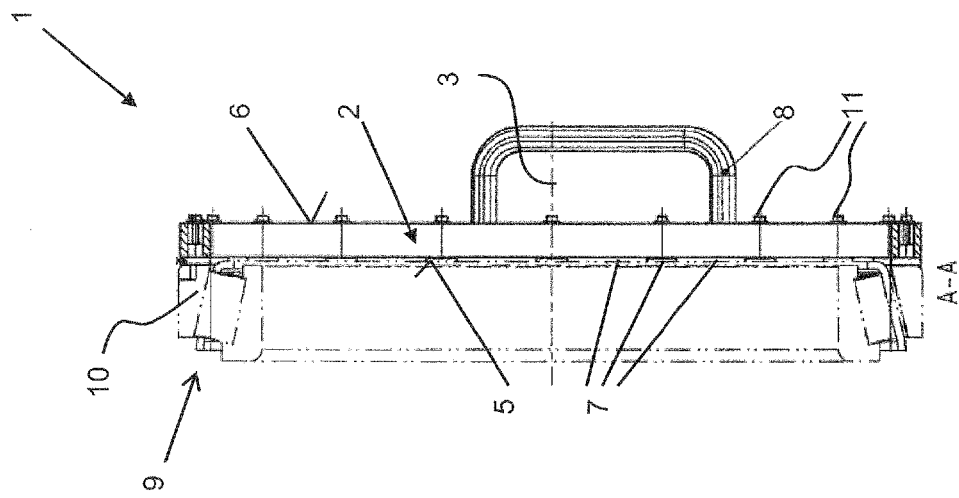
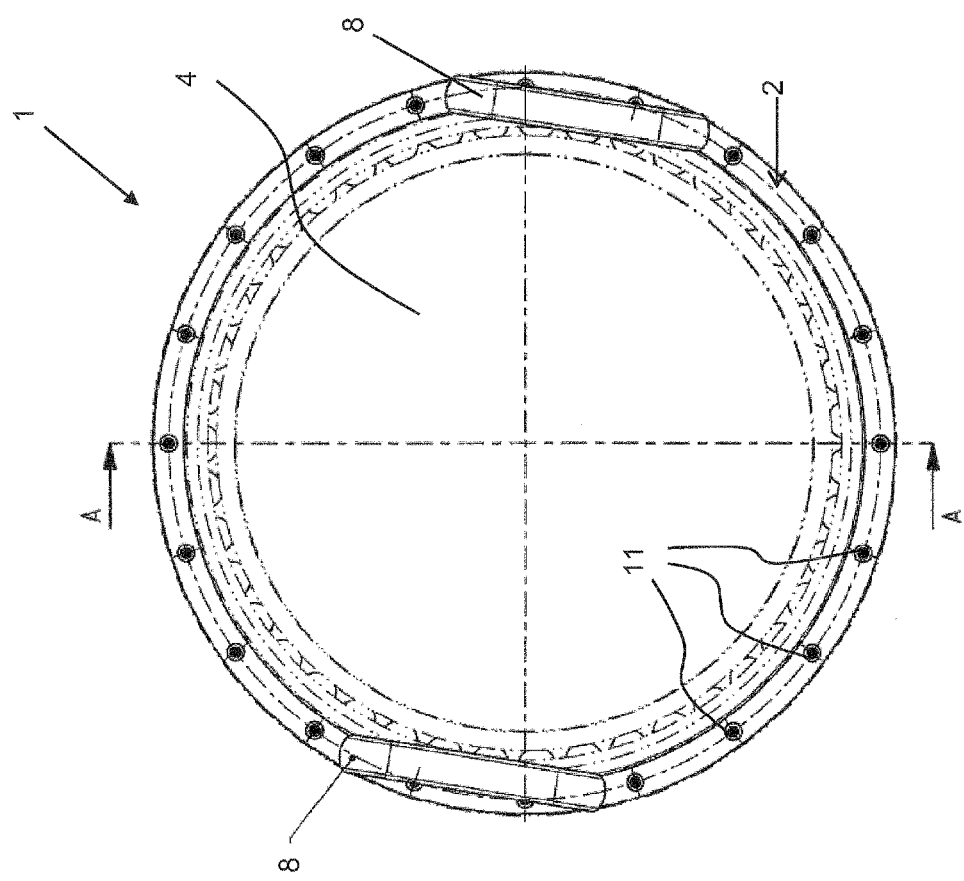

EXTRACTOR TOOL FOR BEARING RINGS

This application claims the priority of DE 20 2010 012 741.6 file Sep. 17, 2010, which is incorporated by reference herein

FIELD OF THE INVENTION

The invention relates to an extractor tool that is suitable, in particular, for bearing rings. Extractor tools are required to demount rolling contact bearings or plain bearings, or their components, such as bearing rings, from a mounting location.

BACKGROUND OF THE INVENTION

Such an extractor tool, which allows a complete bearing to be extracted, or demounted, in that gripper elements engage axially behind the complete bearing, is known from NL 9000631. The extractor tool known from NL 9000631 makes particular demands on the axial structural space, however; in particular, sufficient structural space must be provided in the surrounding construction, to enable the gripper elements to engage behind axially. Moreover, the extractor tool known from NL 9000631 requires that the housing first be demounted from the shaft provided with the bearing, and can therefore be used only in particular mounting situations.

Known from NL 1021272 is an extractor tool that does not require axial engagement behind the bearing in order to extract or demount the same, and therefore does not make any particular demands on the axial structural space, at least; however, in this case, also, it is necessary to provide a radial access to the bearing. Thus, according to NL 1021272, it is either necessary to demount a housing surrounding the bearing, in order to provide a radial access of the extractor tool to an inner ring of the bearing, or it is necessary to demount a shaft extending through the bearing, in order to provide a radial access to an outer ring of the bearing. In the case of NL 1021272, also, the use of the extractor tool is therefore limited to particular mounting situations.

OBJECT OF THE INVENTION

The object of the invention is to provide an extractor tool that is suitable, in particular, for extracting or demounting bearing rings, which can also be used in mounting situations in which radial access and bilateral axial access to the machine part to be demounted are not possible, it being intended that the extractor tool be simple and cost-effective to produce and be easy to operate.

SUMMARY OF THE INVENTION

This object is achieved by the features of the independent claim. Accordingly, an extractor tool of the generic type is characterized in that the extractor tool has at least one magnet for non-positively connecting the extractor tool to a machine part to be extracted, in particular a bearing ring.

Even if the present invention is particularly suited to perform demounting of bearing rings of a rolling contact bearing, it is also suitable, in principle, for demounting other, e.g. rotationally symmetrical bodies from shafts, or from housings. In the following, however, the invention is explained exemplarily in the context of demounting of bearing rings.

The present invention therefore takes an entirely different approach from the described solutions based on the prior art, which hitherto require a positive connection of an extractor tool and bearing rings. The non-positive connection of an extractor tool and, for example, a bearing ring by means of one or more magnets has the great advantage that this connection can be effected exclusively via the outside face of the bearing ring that faces towards the extractor tool. The bearing ring therefore need not be accessible from both axial sides. Nor is it necessary to engage radially behind the bearing ring. Consequently, the invention enables an extractor tool and a bearing ring to be connected in practically all mounting situations, without the necessity of first demounting a shaft or a housing. The size, type and number of the magnets can be selected in such a way that the bearing ring can be demounted by the extractor tool solely by way of the non-positive connection by means of the magnets.

Preferred embodiments are specified in the dependent claims.

According to one embodiment, it is provided that the extractor tool is substantially rotationally symmetrical, and the at least one magnet is arranged on a first outside face of the extractor tool. During demounting of a bearing ring, this first outside face can face towards the latter, whereby an optimal, non-positive connection, contingent upon the magnet, is produced.

It is conceivable, in principle, that the extractor tool has a single, correspondingly dimensioned magnet. It is simpler and less expensive if the extractor tool has a plurality, or a multiplicity, of magnets. According to one embodiment, it is provided that the extractor tool has an annular corpus having a multiplicity of magnets distributed circumferentially over the corpus. Such a corpus enables the extractor tool to be realized without a center, such that the extractor tool can be pushed over a shaft. Ideally, the magnets are arranged with an equidistant circumferential distribution, such that a connection of uniform strength, as viewed circumferentially, is produced between the extractor tool and the bearing ring.

The extractor tool according to the invention is preferably realized as a portable hand tool, and can thus have, for example, one or more handles. Thus, according to a further embodiment, it is provided that the multiplicity of magnets are arranged on a first outside face of the corpus, and the corpus has at least one handle on a second outside face. The handle or handles enables or enable a fitter to place the extractor tool onto the bearing ring, whereby, by means of the magnet or magnets, a non-positive connection is produced between the extractor tool and the bearing ring, and the fitter can extract, or demount, the bearing ring.

According to one embodiment, it is provided that the corpus is composed of metal or plastic, in particular of fabric-base laminate.

The fact that the extractor tool is constituted by a substantially rotationally symmetrical corpus, on which the magnet or magnets is or are located, provides for an extremely simple, and therefore cost-effective, construction. The diameter on which magnets are located can be exactly matched to a bearing ring to be demounted. In addition, very simple handling of the extractor tool is achieved.

It is also conceivable, however, for the knowledge according to the invention, namely, to create a possibility enabling bearing rings to be demounted by a non-positive, magnet-contingent connection between the extractor tool and a bearing ring, to be transferred to an extractor tool that is suitable for demounting bearing rings of differing diameter.

Accordingly, it is provided, according to a further embodiment, that the extractor tool has at least two gripping elements, on each of which at least one magnet is arranged, and the at least two gripping elements are movable relative to one another, in order to enable the extractor tool to be non-positively connected to bearing rings of differing diameter.

In principle, according to the invention, it is to be possible to demount the bearing ring solely through the magnet-contingent, non-positive connection. Thus, in particular, no further connections are necessary between the extractor tool and the bearing ring and, according to one embodiment, it is explicitly provided that the extractor tool does not have any means for positively connecting the extractor tool to a machine part to be extracted, in particular a bearing ring. The extractor tool in this case is simple to produce and operate. Clearly, nevertheless, additional, e.g. positive, connections between the extractor tool and a bearing ring could be conceivable according to a different embodiment.

The type of the magnets depends on the intended application, e.g. size and weight of the bearing ring or accessibility of the bearing location. In principle, both permanent magnets and electromagnets can be used—as also combinations thereof.

Insofar as one or more electromagnets are used, the extractor tool comprises connections to the energy supply and/or to the controller of the electromagnets. It is also conceivable that an energy supply and/or a controller of the electromagnets be integrated into the extractor tool, such that the extractor tool can continue to be used as a portable tool.

Clearly, the extractor tool according to the invention can be used not only for demounting, i.e. removing, a bearing ring from a bearing location. Rather, it can also be used, equally, for mounting, i.e. for placing a bearing ring into a bearing location. The extractor tool can also serve for demounting and/or mounting a complete bearing or other, preferably rotationally symmetrical, machine parts.

Owing to its compactness, the extractor tool according to the invention is particularly suitable in applications with bearing locations that are difficult to access, or in situations in which equipment such as tools can be applied to the bearing location only with difficulty, such as, for example, in the case of demounting of a transmission bearing of a wind turbine generator.

BRIEF DESCRIPTION OF THE DRAWINGS

An exemplary embodiment of the present invention is shown in the following with reference to the FIGURE, wherein FIG. 1 shows an extractor tool according to the invention, non-positively connected to a tapered roller bearing.

DETAILED DESCRIPTION OF THE DRAWING

Represented in FIG. 1 is an extractor tool 1 having an annular corpus 2. The corpus 2 is composed of a fabric-base laminate, and is constructed as a single piece; clearly, a multipart structure of the corpus 2, e.g. by way of a plurality of identical segments, would likewise be possible. The corpus 2, which is symmetrical in relation to the rotational axis 3, is realized without a center, i.e. it has a corresponding opening 4, whereby the extractor tool 1 can be pushed onto a shaft, not represented.

The corpus 2 has a substantially rectangular cross-section, having a first outside face 5 and a second outside face 6.

Arranged on its first outside face 5 are a multiplicity of magnets 7. The magnets are permanent magnets. In principle, the magnets 7 can project from the first outside face 5 or, alternatively, they can also be flush with the first outside face 5, or even be protected by a protective layer, not represented, against damage and soiling.

The magnets 7 are arranged so as to be circumferentially equidistant, and are connected to the corpus 2 by screws 11.

Two handles 8 are arranged on the second outside face 6, to enable a fitter to place the extractor tool onto the bearing ring.

As can be seen in the sectional representation A-A in FIG. 1, the extractor tool 1 has been placed on a tapered roller bearing 9. In particular, the magnets 7 effect a non-positive connection between the extractor tool 1 and an outer ring 10 of the tapered roller bearing 9. This non-positive connection makes it possible to demount the outer ring 10, in that the extractor tool 1 is drawn away axially, at its handles 8, from the tapered roller bearing 9.

LIST OF REFERENCES

1 Extractor tool
2 Corpus
3 Rotational axis
4 Opening
5 First outside face
6 Second outside face
7 Magnet
8 Handle
9 Tapered roller bearing
10 Outer ring
11 Screw

The invention claimed is:

1. An extractor tool for extracting a ring-shaped machine part from a working position along an axis, wherein the extractor tool comprises:
   an annular corpus having an opening through a center and a first outside face;
   at least one magnet for non-positively connecting the first outside face of the extractor tool to the ring-shaped machine part; and
   at least one handle on a second outside face wherein the handle is U-shaped having two legs and a bottom portion connecting the two legs, the handle is connected to the second outside face so that the bottom portion of the handle faces away from the first outside face.

2. The extractor tool according to claim 1, wherein the extractor tool is substantially rotationally symmetrical, and the at least one magnet is arranged on the first outside face of the annular corpus.

3. The extractor tool according to claim 1, wherein a multiplicity of magnets are distributed circumferentially over the annular corpus.

4. The extractor tool according to claim 3, wherein the multiplicity of magnets are arranged on the first outside face of the annular corpus.

5. The extractor tool according to claim 3, wherein the annular corpus is composed of metal or plastic.

6. The extractor tool according to claim 1, wherein the extractor tool has at east two gripping elements, on each of which at least one magnet is arranged, and the at least two gripping elements are movable relative to one another, in order to enable the extractor tool to be non-positively connected to rings of differing diameter.

7. The extractor tool according to claim 1, wherein the at least one magnet is connected to the annular corpus by screwed connection and/or adhesive bonding.

8. The extractor tool according to claim 1, wherein the extractor tool does not have any means for positively connecting the extractor tool to the machine part to be extracted.

9. The extractor tool according to claim 1, wherein the at least one magnet is a permanent magnet.

10. The extractor tool according to claim 1, wherein the at least one magnet is an electromagnet.

11. The extractor tool according to claim 1, wherein the machine part is a bearing ring.

12. The extractor tool according to claim 5, wherein the annular corpus is composed of a fabric-base laminate.

* * * * *